United States Patent
Kenichi (10) Patent No.: US 9,667,120 B2
(45) Date of Patent: May 30, 2017

(54) DRIVE DEVICE (71) Applicant: Webasto SE, Stockdorf (DE)

(72) Inventor: Niki Kenichi, Higashi-Hiroshima (JP)

(73) Assignee: Webasto SE, Stockdorf (DE)

( * ) Notice: Subject to any disclaimer, the term of this patent is extended or adjusted under 35 U.S.C. 154(b) by 419 days.

(21) Appl. No.: 14/388,350

(22) PCT Filed: Apr. 3, 2013

(86) PCT No.: PCT/IB2013/052664
§ 371 (c)(1),
(2) Date: Sep. 26, 2014

(87) PCT Pub. No.: WO2013/150465
PCT Pub. Date: Oct. 10, 2013

(65) Prior Publication Data
US 2015/0038291 A1 Feb. 5, 2015

(30) Foreign Application Priority Data
Apr. 3, 2012 (JP) ................................ 2012-084967

(51) Int. Cl.
B60J 7/057 (2006.01)
H02K 7/116 (2006.01)
(Continued)

(52) U.S. Cl.
CPC ............ H02K 7/116 (2013.01); B60J 7/0573 (2013.01); E05F 11/426 (2013.01); E05F 15/40 (2015.01);
(Continued)

(58) Field of Classification Search
CPC ........... B60J 7/0573; B60J 7/192; E05F 15/40
(Continued)

(56) References Cited

U.S. PATENT DOCUMENTS 4,659,140 A * 4/1987 Fuerst ..................... B60J 7/057
296/216.03
7,891,730 B2 * 2/2011 Rikkert .................. B60J 7/0573
296/220.01

(Continued)

FOREIGN PATENT DOCUMENTS

EP 1 103 411 A1 5/2001
EP 2 098 396 A1 9/2009
(Continued)

OTHER PUBLICATIONS

Translation of JP62196885.*
International Search Report and Written Opinion under date of mailing of Jul. 2, 2013 in connection with PCT/IB2013/052664.

Primary Examiner — Dennis H Pedder
(74) Attorney, Agent, or Firm — Quarles & Brady LLP

(57) ABSTRACT

[Problem] A drive unit (10) for driving, via a first and second geared cable (8, 9), a first and second member to be driven (sun roof and shade) provided to an opening part formed on the secured roof of a vehicle, wherein while being able to switch between a state in which the power from a motor (18) is transferred to both the first and second members to be driven and a state in which the power is selectively transferred to the first or second member to be driven, the member to be driven, in which the transfer of the power from the motor (18) is blocked, is prevented from moving during an impact when the vehicle collides in the selective transfer state. [Solution] The output path of the motor (18) is divided into a first and second output shaft (22, 42). Moreover, a first and second electromagnetic clutch (24, 44) for switching between connecting/disconnecting a first and second pinion gear (23, 43) to/from the first and second output shafts (22, 42) is provided, and each pinion gear (23, 43) is secured to a frame (3) so as to not be able to rotate when disconnecting from the clutches (24, 44).

3 Claims, 5 Drawing Sheets (51) Int. Cl.
*E05F 11/42* (2006.01)
*E05F 15/40* (2015.01)
*F16H 1/20* (2006.01)

(52) U.S. Cl.
CPC .......... *F16H 1/20* (2013.01); *E05Y 2201/216* (2013.01); *E05Y 2201/246* (2013.01); *E05Y 2201/462* (2013.01); *E05Y 2201/648* (2013.01); *E05Y 2201/654* (2013.01); *E05Y 2201/724* (2013.01); *E05Y 2800/40* (2013.01); *E05Y 2900/542* (2013.01); *Y10T 477/327* (2015.01)

(58) Field of Classification Search
USPC .................................................. 296/223, 214
See application file for complete search history.

(56) References Cited

U.S. PATENT DOCUMENTS

| | | | | |
|---|---|---|---|---|
| 8,439,433 B2 * | 5/2013 | Kim | ........................ | B60J 7/0573 |
| | | | | 296/214 |
| 8,690,235 B2 * | 4/2014 | Lee | ........................ | E05F 15/643 |
| | | | | 296/214 |

FOREIGN PATENT DOCUMENTS

| | | | |
|---|---|---|---|
| JP | 62196885 | * | 12/1987 |
| JP | S62 196885 U | | 12/1987 |

* cited by examiner

DRIVE DEVICE

CROSS-REFERENCE TO RELATED APPLICATIONS

This application represents the national stage entry of PCT International Application No. PCT/IB2013/052664 filed Apr. 3, 2013 which claims the benefit of Japanese Patent Application 2012-084967 filed Apr. 3, 2012, both of which are hereby incorporated herein by reference for all purposes.

TECHNICAL FIELD

The present disclosure is in a technical field of a drive device configured to drive two driven members, such as a sunroof and a shade, provided at an opening formed in a fixed roof of a vehicle.

BACKGROUND ART

A drive device including a single motor, a drive gear connected to an output shaft of the motor, first and second transmission gears engaged with the drive gear, first and second output shafts connected respectively to the first and second transmission gears, and first and second pinion gears rotatably connected respectively to the first and second output shafts has been known as the drive device of this type (see, e.g., Patent Document 1). A first geared cable configured to drive a first driven member is engaged with the first pinion gear, and a second geared cable configured to drive a second driven member is engaged with the second pinion gear. According to the foregoing configuration, two driven members (i.e., the first and second driven members) can be simultaneously driven by a single motor.

CITATION LIST

Patent Document

[Patent Document 1] Japanese Utility Model Publication No. S62-196885

SUMMARY OF THE INVENTION

Technical Problem

For example, a glass panel and a shade may be employed as the foregoing two driven members. In such a case, user needs such as a need for opening only the shade while maintaining the glass panel closed or a need for closing only the glass panel while maintaining the shade open vary depending on, e.g., weather outside a vehicle and the intensity of sunlight.

However, in the conventional drive device as described in Patent Document 1, the single motor is driven to simultaneously drive the two driven members, and therefore the opening/closing operation for, e.g., closing only the glass panel or opening only the shade as described above cannot be realized. Thus, the user needs cannot be satisfied. In order to satisfy the user needs, it is necessary to prepare two drive motors, resulting in disadvantages that the size of the entirety of the device and a device cost are increased.

In order to overcome the foregoing disadvantages, an electromagnetic clutch may be provided between the output shaft and the pinion gear to switch connection/disconnection of the output shaft and the pinion gear. In such a manner that connection/disconnection in each electromagnetic clutch is switched depending on the user needs, the drive device can be switched between the state in which rotative power of the motor is transmitted to both of the two pinion gears (i.e., the two driven members) and the state in which rotative power of the motor is selectively transmitted to one of the pinion gears.

In the foregoing case, although the user needs can be satisfied, the following disadvantage is caused: when, e.g., one of the electromagnetic clutches is in a disconnection state, if vehicle collision occurs, the pinion gear disconnected from the output shaft by the electromagnetic clutch easily moves (i.e., rotates) due to impact upon the collision. This results in the following disadvantages: the position of the opened/closed driven member connected to the pinion gear cannot be accurately determined by an ECU; and such a driven member is slammed shut by rotation of the pinion gear and therefore is damaged.

The present disclosure has been made in view of the foregoing, and it is an objective of the present disclosure to devise a configuration of a drive device configured to drive two driven members, such as a sunroof and a shade, provided at an opening formed in a fixed roof of a vehicle such that the drive device is, depending on user needs, switchable between an unselective transmission state in which power of a motor is transmitted to both of the driven members and a selective transmission state in which power of the motor is selectively transmitted to one of the driven members and that, if vehicle collision occurs in the selective transmission state, the other driven member for which power transmission from the motor is blocked is prevented from easily moving due to impact upon the collision.

Solution to the Problem

A first aspect of the invention is intended for a drive device for driving first and second driven members provided at an opening formed in a fixed roof of a vehicle.

The drive device includes a single motor; a single drive gear directly connected to an output shaft of the motor or connected to the output shaft of the motor through a reduction gear; first and second power transmission gears engaged with the drive gear; a first output shaft connected to the first power transmission gear so as to rotate together with the first power transmission gear; a second output shaft connected to the second power transmission gear so as to rotate together with the second power transmission gear; a first pinion gear engaged with a first drive cable for driving the first driven member and supported so as to be fitted onto the first output shaft; a second pinion gear engaged with a second drive cable for driving the second driven member and supported so as to be fitted onto the second output shaft; a first electromagnetic clutch configured to switch between a connection state in which the first pinion gear is connected to the first output shaft so as to rotate together with the first output shaft and a disconnection state in which the first pinion gear and the first output shaft are disconnected from each other; and a second electromagnetic clutch configured to switch between a connection state in which the second pinion gear is connected to the second output shaft so as to rotate together with the second output shaft and a disconnection state in which the second pinion gear and the second output shaft are disconnected from each other. The first electromagnetic clutch includes first fixing means configured to unrotatably fix the first pinion gear to a fixed member of the vehicle in the disconnection state of the first electromagnetic clutch, and the second electromagnetic clutch includes second fixing means configured to unrotatably fix the second pinion gear to the fixed member of the vehicle in the disconnection state of the second electromagnetic clutch.

According to the first aspect of the invention, when the motor is driven, rotative power of the motor is transmitted from the drive gear to the first and second output shafts through the first and second power transmission gears. The rotative power transmitted to the first and second output shafts is transmitted to the first and second pinion gears. In the present disclosure, the first electromagnetic clutch is interposed between the first output shaft and the first pinion gear, and the second electromagnetic clutch is interposed between the second output shaft and the second pinion gear. Thus, rotative power of the motor can be, depending on user needs, transmitted to both of the pinion gears or be selectively transmitted to one of the pinion gears.

That is, when both of the first and second electromagnetic clutches are in the connection state, rotative power of the motor is transmitted to the first and second pinion gears through the first and second output shafts. As a result, the first and second driven members are simultaneously driven by the first and second drive cables engaged respectively with the first and second pinion gears.

On the other hand, when only the first electromagnetic clutch is in the connection state and the second electromagnetic clutch is in the disconnection state, rotative power of the motor is transmitted only to the first pinion gear through the first output shaft, and is not transmitted to the second pinion gear. As a result, while the second driven member is stopped, only the first driven member is driven by the first drive cable engaged with the first pinion gear. Upon driving, power transmission between the second pinion gear and the motor is blocked. However, since the second pinion gear is fixed to the fixed roof by the second fixing means of the second electromagnetic clutch, the second pinion gear does not move due to, e.g., impact even if vehicle collision occurs.

Moreover, when only the second electromagnetic clutch is in the connection state and the first electromagnetic clutch is in the disconnection state, rotative power of the motor is transmitted only to the second pinion gear through the second output shaft, and is not transmitted to the first pinion gear. As a result, while the first driven member is stopped, only the second driven member is driven by the second drive cable engaged with the second pinion gear. Upon driving, power transmission between the first pinion gear and the motor is blocked. However, since the first pinion gear is fixed to the fixed roof by the first fixing means of the first electromagnetic clutch, the first pinion gear does not move due to, e.g., impact even if vehicle collision occurs.

Thus, in the present disclosure, in such a manner that connection/disconnection in each of the electromagnetic clutches is switched, the drive device is, depending on the user needs, switchable between an unselective transmission state in which power of the motor is transmitted to both of the first and second driven members and a selective transmission state in which power of the motor is selectively transmitted to one of the driven members. Moreover, if vehicle collision occurs in the selective transmission state, the other driven member for which power transmission from the motor is blocked is prevented from easily moving due to impact upon the collision.

A second aspect of the invention is intended for the drive device of the first aspect of the invention, in which the first electromagnetic clutch further includes a fixed clutch plate coaxially fixed to the first output shaft so as to rotate together with the first output shaft, and a movable clutch plate supported so as to slide in an axial direction on the first pinion gear and to rotate together with the first pinion gear and arranged so as to face the fixed clutch plate in the axial direction, and a clutch engagement part to be engaged with an engagement part of the fixed clutch plate when the first electromagnetic clutch is in the connection state is formed at one of side surfaces of the movable clutch plate, a fixing engagement part to be engaged with an engagement part of the fixed member of the vehicle when the first electromagnetic clutch is in the disconnection state is formed at the other side surface of the movable clutch plate, and the fixing engagement part serves as the first fixing means.

A third aspect of the invention is intended for the drive device of the second aspect of the invention, in which the second electromagnetic clutch further includes a fixed clutch plate coaxially fixed to the second output shaft so as to rotate together with the second output shaft, and a movable clutch plate supported so as to slide in the axial direction on the second pinion gear and to rotate together with the second pinion gear and arranged so as to face the fixed clutch plate in the axial direction, and a clutch engagement part to be engaged with an engagement part of the fixed clutch plate when the second electromagnetic clutch is in the connection state is formed at one of side surfaces of the movable clutch plate, a fixing engagement part to be engaged with an engagement part of the fixed member of the vehicle when the second electromagnetic clutch is in the disconnection state is formed in the other side surface of the movable clutch plate, and the fixing engagement part serves as the second fixing means.

According to the second and third aspects of the invention, if one of the first and second electromagnetic clutches is in the disconnection state, the fixing engagement part of the movable clutch plate of the electromagnetic clutch which is in the disconnection state is engaged with the engagement part provided in the fixed member of the vehicle. As a result, the pinion gear connected to the movable clutch plate so as to rotate together with the movable clutch plate is unrotatably fixed to the fixed member. Thus, even if vehicle collision occurs in such a state, the pinion gear does not move.

The clutch engagement part is formed at one of the side surfaces of the single movable clutch plate, and the fixing engagement part is formed at the other side surface. Thus, it can be ensured that the pinion gear disconnected from the output shaft is fixed with a simple configuration.

Advantages of the Invention

As described above, according to the drive device of the present disclosure, the drive device is, depending on the user needs, switchable between the unselective transmission state in which power of the motor is transmitted to both of the two driven members and the selective transmission state in which power of the motor is transmitted to one of the two driven members. Moreover, it can be ensured that, if vehicle collision occurs in the selective transmission state, the other driven member for which power transmission from the motor is blocked is prevented from moving due to impact upon the collision.

BRIEF DESCRIPTION OF THE DRAWINGS

FIGS. 5(a) and 5(b) are cross-sectional views along a V-V line illustrated in FIG. 3. FIG. 5(a) illustrates the case where the electromagnetic clutch is in the disconnection state. FIG. 5(b) illustrates the case where the electromagnetic clutch is in the connection state.

DESCRIPTION OF EMBODIMENTS

An embodiment of the present disclosure will be described below in detail with reference to drawings.

Figure 1:
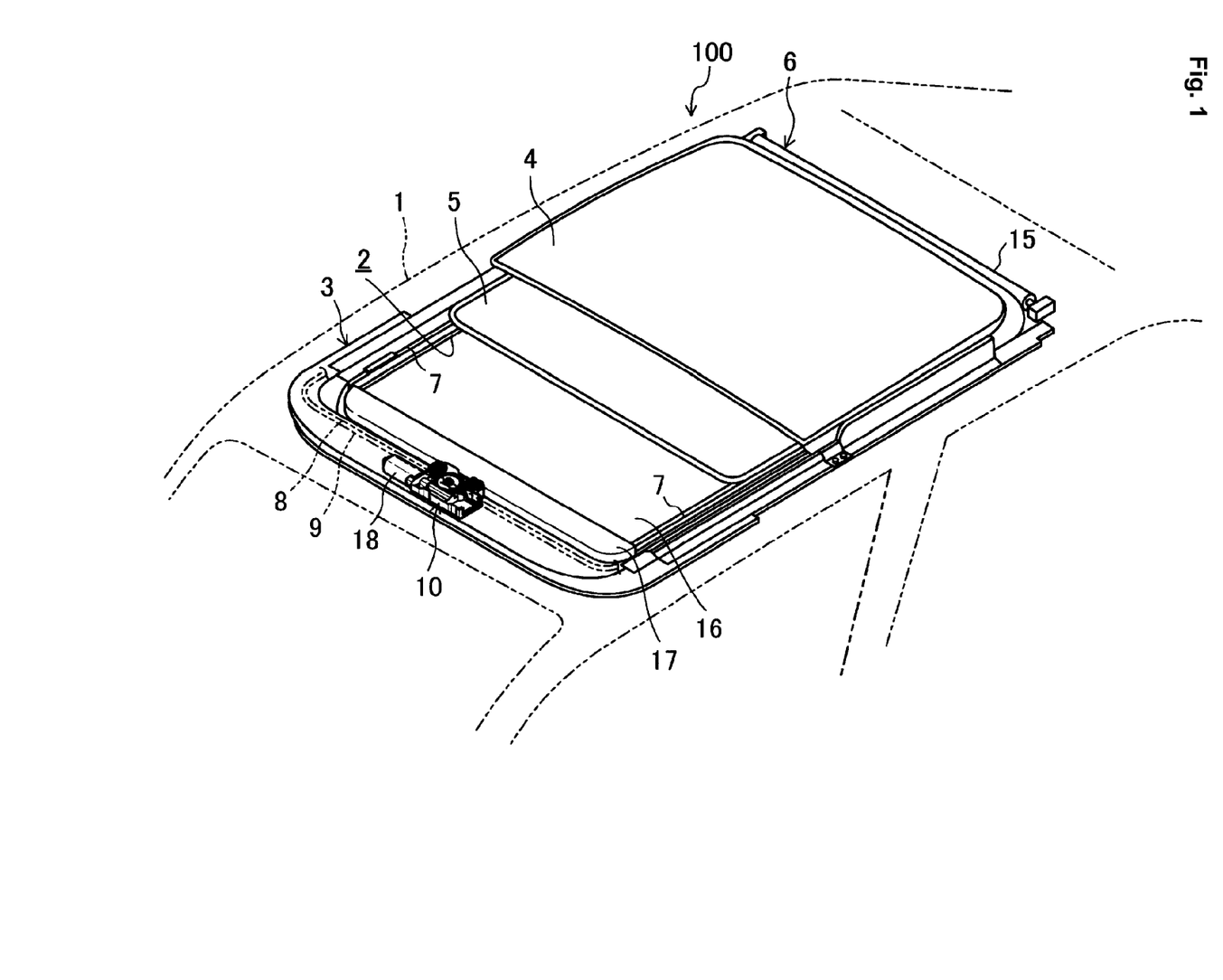
FIG. 1 is a perspective view diagonally from a front upper left side of a vehicle, and illustrates a fixed roof of the vehicle on which a drive unit (drive device) of an embodiment is mounted.
Figure 2:
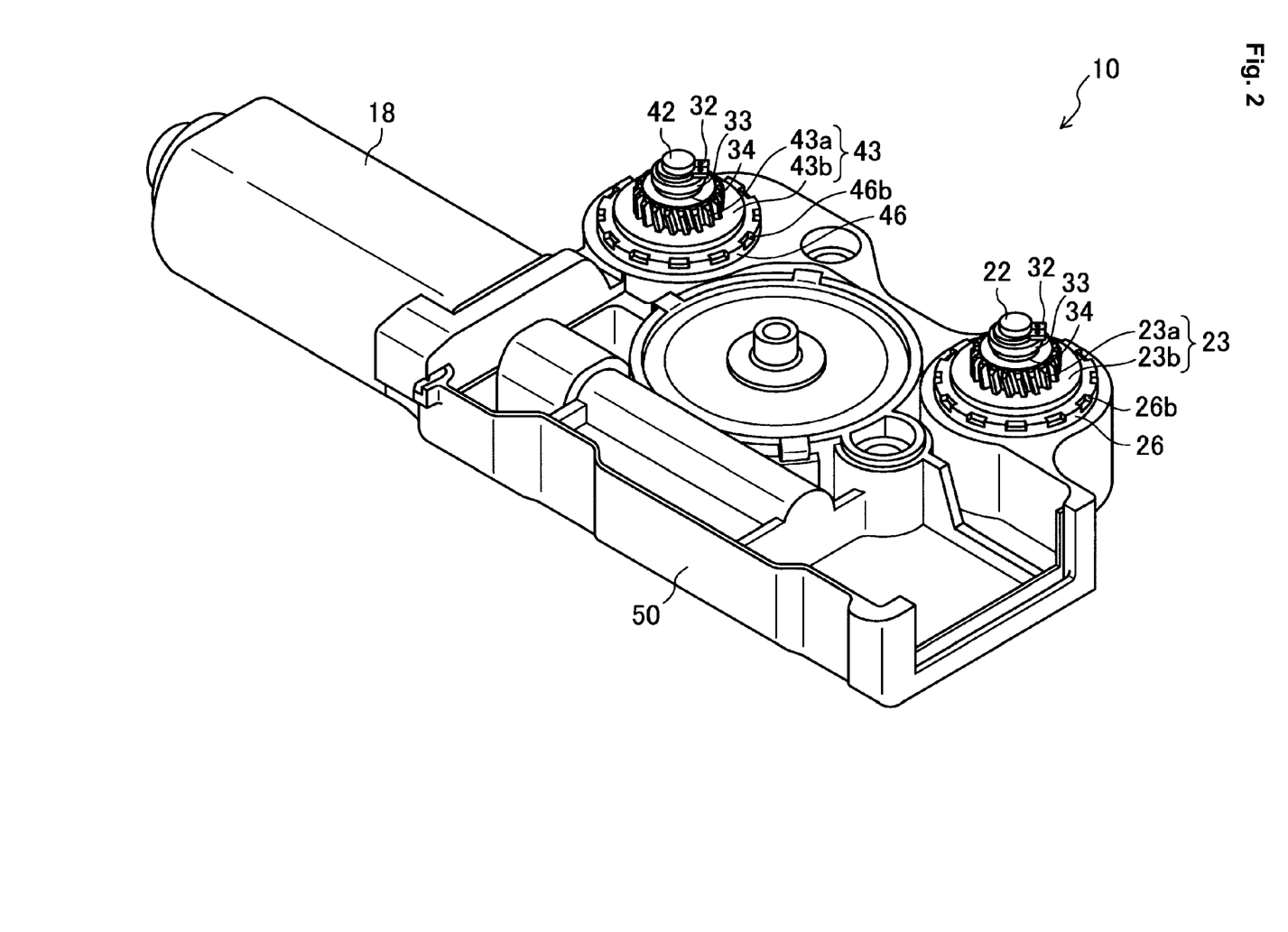
FIG. 2 is a perspective view from a side close to a pinion gear, and illustrates the drive unit.

FIG. 1 is a perspective view of a sunroof apparatus 100. In the present specification, a front side and a rear side in a front-back direction of a vehicle are, for the sake of simplicity of description, referred to as "front" and "rear," and a left side and a right side in a vehicle width direction are referred to as "left" and "right."

The sunroof apparatus 100 is mounted at an opening 2 formed in a fixed roof 1 of the vehicle. The sunroof apparatus 100 includes a frame 3 arranged along an edge of the opening 2, a fixed panel (glass panel in the present embodiment) 4 attached so as to be fixed at the rear half of the frame 3, a movable panel 5 movably attached to the frame 3, an opening/closing mechanism (not shown in the figure) configured to open/close the movable panel 5, and a roller shade 6 attached to a lower side of the fixed panel 4.

The opening/closing mechanism is, e.g., a well-known mechanism described in Japanese Patent Publication No. 2000-185554, and includes a pair of right and left sliders (not shown in the figure) connected, by cams, to an elongated panel support plate fixed to a lower surface of the movable panel 5. Each of the sliders is connected to a corresponding one of right and left guide rails 7 which form right and left parts of the frame 3, and is slidable in the front-back direction. In such a manner that the sliders move so as to slide in the front-back direction, the movable panel 5 is inclined together with the panel support plate or moves so as to slide back and forth. The sliders are driven by a later-described drive unit 10 through a first geared cable 8.

The roller shade 6 includes a winding roller 15 extending in the vehicle width direction, and a shade (light shielding sheet) 16 wound around the winding roller 15. A garnish 17 extending in the vehicle width direction is connected to an end part of the shade 16 on a side on which the shade 16 is pulled out, and a runner part is formed in each of end parts of the garnish 17 in the vehicle width direction. Each of the runner parts is connected to a corresponding one of the guide rails 7 so as to slide in the front-back direction. In such a manner that the runner parts move back and forth along the guide rails 7, the shade 16 is opened/closed. The runner parts are driven by the drive unit 10 through a second geared cable 9.

Each of the first and second geared cables 8, 9 is formed of a cable member including a gear part at an outer circumferential surface thereof, and is accommodated in a groove formed in the frame 3 so as to move in a length direction.

The drive unit 10 is attached to a lower surface of a front end part of the frame 3 (i.e., to a side surface of a vehicle interior). Specifically, the drive unit 10 is, referring to FIGS. 2-5, a unit configured such that a single electrical motor (hereinafter simply referred to as a "motor") 18, a single drive gear 19, and first and second gear mechanisms 20, 40 connected to the drive gear 19 are supported on a single casing 50. The first gear mechanism 20 is a mechanism configured to transmit rotative power of the drive gear 19 to the first geared cable 8 which is a cable for driving the movable panel 5 (i.e., the sliders), and the second gear mechanism 40 is a mechanism configured to transmit rotative power of the drive gear 19 to the second geared cable 9 which is a cable for driving the shade 16 (i.e., the runner parts). In the present embodiment, the movable panel 5 corresponds to a first driven member, and the shade 16 corresponds to a second driven member.

The motor 18 is electrically connected to an ECU which is not shown in the figure, and is operated by receiving a command from the ECU. In the present embodiment, the motor 18 is arranged such that an output shaft thereof faces in the vehicle width direction. A worm gear 51 is connected to the output shaft of the motor 18 so as to rotate together with the output shaft of the motor 18, and an input gear 53 configured to rotate about an axis perpendicular to the output shaft 52 of the motor 18 is engaged with the worm gear 51. The input gear 53 is a helical gear. The input gear 53 is, through an input shaft 54 (illustrated only in FIG. 3) extending in the vertical direction, connected to the drive gear 19 so as to rotate together with the drive gear 19.

Figure 3:
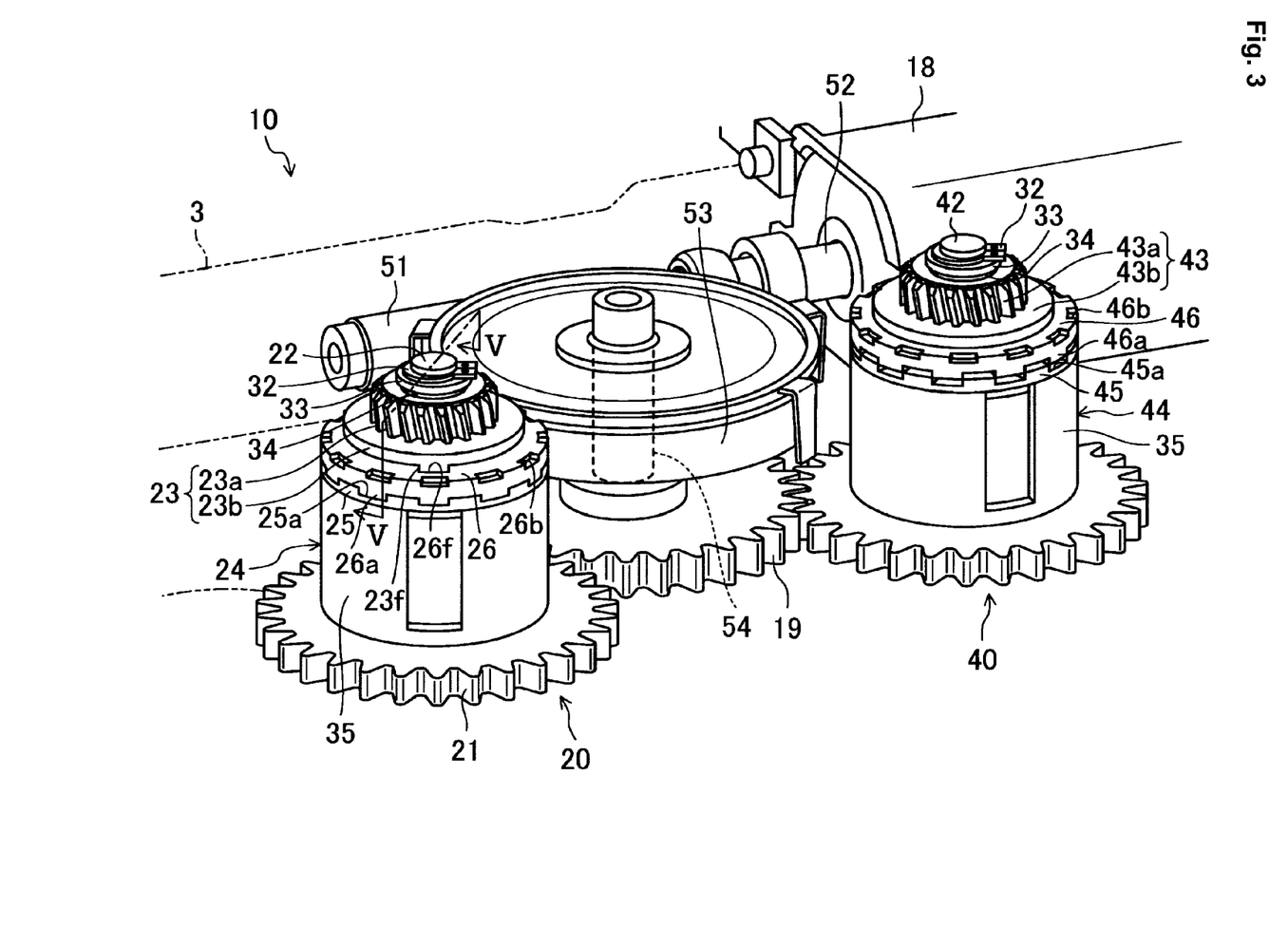
FIG. 3 is a perspective view illustrating an internal structure of the drive unit, and illustrates the case where a first electromagnetic clutch is in a connection state and a second electromagnetic clutch is in a disconnection state.
Figure 4:
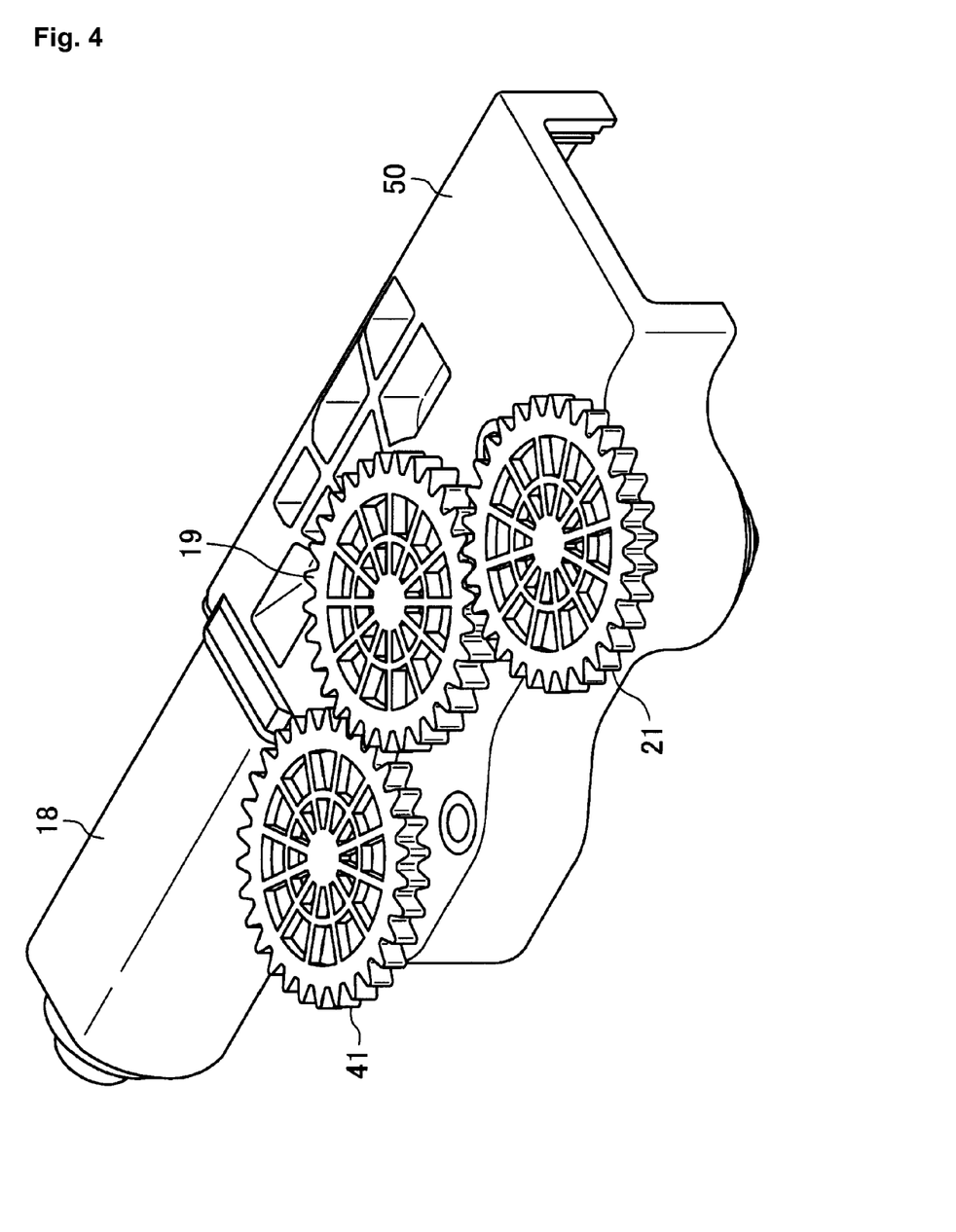
FIG. 4 is a perspective view from a side opposite to the side close to the pinion gear, and illustrates the drive unit.
Figure 5:
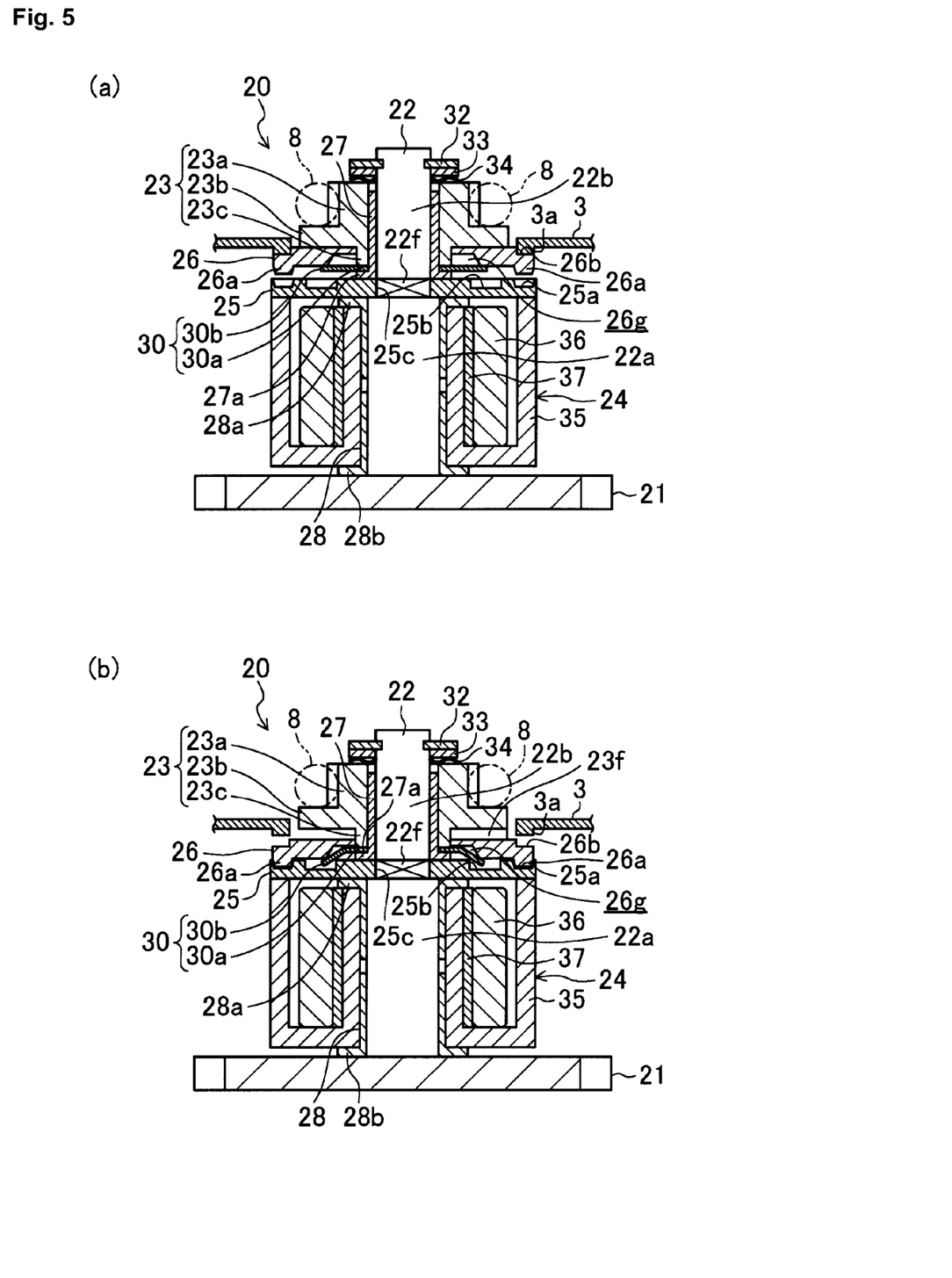

Referring to FIGS. 3 and 5, the first gear mechanism 20 includes a first power transmission gear 21 engaged with the drive gear 19, a first output shaft 22 connected to the first power transmission gear 21 so as to rotate together with the first power transmission gear 21, a first pinion gear 23 rotatably connected to the first output shaft 22, and a first electromagnetic clutch 24. The drive gear 19 and the first power transmission gear 21 are both spur gears. The first pinion gear 23 is a helical gear, and is engaged with the first geared cable 8 connected to the sliders.

The first electromagnetic clutch 24 is an engagement clutch configured to engage/disengage a fixed clutch plate 25 and a movable clutch plate 26 with/from each other to switch transmission of rotative power of the motor to the first pinion gear 23 between ON and OFF. Specifically, the first electromagnetic clutch 24 is configured to switch between a connection state in which the first pinion gear 23 is connected to the first output shaft 22 so as to rotate together with the first output shaft 22 and a disconnection state in which the first pinion gear 23 and the first output shaft 22 are disconnected from each other. The operation of the first electromagnetic clutch 24 will be described in detail later.

The first output shaft 22 extends in the vertical direction so as to be parallel to the input shaft 54. The first power transmission gear 21 is connected and fixed to a lower end part of the first output shaft 22, and the first pinion gear 23 is supported so as to be fitted onto an upper end part of the first output shaft 22 with an upper bearing 27 being interposed therebetween.

The first output shaft 22 is a stepped shaft having a large-diameter shaft part 22a and a small-diameter shaft part 22b upwardly extending from an upper end part of the large-diameter shaft part 22a. An annular clutch casing 35 having the closed bottom is fitted onto the large-diameter shaft part 22a with a lower bearing 28 being interposed therebetween. An annular electromagnetic coil 36 is coaxially accommodated in the clutch casing 35, and an insulating block 37 is interposed between an inner circumferential surface of the electromagnetic coil 36 and an inner circumferential wall of the clutch casing 35. The electromagnetic coil 36 is configured such that the ECU which is not shown in the figure switches current application to the electromagnetic coil 36 between ON and OFF. An opening of the clutch casing 35 at an upper end thereof is closed by the fixed clutch plate 25. Although not shown in the figure, a slight clearance is formed between a lower surface of a circumferential edge part of the fixed clutch plate 25 and an upper end surface of the clutch casing 35. Thus, the fixed clutch plate 25 and the clutch casing 35 do not contact each other. The lower bearing 28 is a substantially cylindrical plain bearing, and upper and lower end parts of the lower bearing 28 form upper and lower flange parts 28a, 28b outwardly protruding in a radial direction, respectively. The clutch casing 35 is, at an inner circumferential edge part of a lower surface thereof, supported in the state in which the inner circumferential edge part contacts an upper surface of the lower flange part 28b of the lower bearing 28. The fixed clutch plate 25 slidably contacts an upper surface of the upper flange part 28a of the lower bearing 28.

The fixed clutch plate 25 is formed of a discoid metal member. In a circumferential edge part of an upper surface of the fixed clutch plate 25, a plurality of engagement recessed parts 25a are formed at predetermined intervals in a circumferential direction. An annular clearance groove 25b allowing deformation of a plate spring 30 upon operation (connection) of the clutch is formed in part of the upper surface of the fixed clutch plate 25 on an inner side relative to the engagement recessed parts 25a in the radial direction. An engagement hole 25c into which a base part of the small-diameter shaft part 22b of the first output shaft 22 is fitted is formed in a center part of the fixed clutch plate 25. In the base part of the small-diameter shaft part 22b, two flat cut surfaces 22f are formed so as to have a width across flats. In such a manner that the base part of the small-diameter shaft part 22b is fitted into the engagement hole 25c of the fixed clutch plate 25, rotation of the fixed clutch plate 25 relative to the first output shaft 22 is restricted. Thus, the fixed clutch plate 25 is connected to the first output shaft 22 so as to rotate together with the first output shaft 22.

In part of the first gear mechanism 20 above the cut surfaces 22f of the small-diameter shaft part 22b, the first pinion gear 23 and the movable clutch plate 26 are supported. The first pinion gear 23 is supported so as to be fitted onto the small-diameter shaft part 22b with the upper bearing 27 being interposed therebetween. The first pinion gear 23 includes a gear body 23a including a tooth part at an outer circumferential surface thereof, a flange part 23b outwardly protruding from a lower end part of the gear body 23a in the radial direction, and a cylindrical part 23c downwardly protruding from an inner circumferential edge part of the flange part 23b. An outer circumferential surface of the cylindrical part 23c is slidable on an inner circumferential surface of the movable clutch plate 26. The outer circumferential surface of the cylindrical part 23c also serves as a guide surface on which the movable clutch plate 26 is slidably guided in the vertical direction.

A block-shaped key part 23f (see FIGS. 3 and 5(b)) outwardly extending from the outer circumferential surface of the cylindrical part 23c in the radial direction and having a rectangular cross section is formed at a lower surface of the flange part 23b of the first pinion gear 23.

The movable clutch plate 26 is formed in a substantially discoid shape, and is arranged so as to face the fixed clutch plate 25 in an axial direction. A key groove 26f (illustrated only in FIG. 3) extending in the radial direction is formed at an upper surface of the movable clutch plate 26. In such a manner that the key part 23f of the first pinion gear 23 is fitted into the key groove 26f, the movable clutch plate 26 is connected to the first pinion gear 23 so as to rotate together with the first pinion gear 23. Even when the movable clutch plate 26 downwardly slides to be engaged with the fixed clutch plate 25, the key part 23f of the first pinion gear 23 has an enough height so as not to be detached from the key groove 26f.

A plurality of raised clutch tooth parts 26a are formed at a lower surface of an outer circumferential edge part of the movable clutch plate 26, and a plurality of engagement recessed parts 26b for fixing are formed at an upper surface of the outer circumferential edge part of the movable clutch plate 26. The clutch tooth parts 26a are arranged apart from each other in the circumferential direction, and the engagement recessed parts 26b are arranged apart from each other in the circumferential direction. A deformation recessed part 26g allowing deformation of the plate spring 30 upon operation of the first electromagnetic clutch 24 (i.e., upon current application) is formed at a lower surface of an inner circumferential edge part of the movable clutch plate 26.

In the state in which current application to the electromagnetic coil 36 is OFF, the movable clutch plate 26 is upwardly biased by the plate spring 30. The plate spring 30 includes a ring part 30a sandwiched between an upper surface of a flange part 27a of the upper bearing 27 and a lower end surface of the first pinion gear 23, and three elastic arm parts 30b (only two elastic arm parts 30b are illustrated in FIG. 5) radially extending from the ring part 30a toward the outside in the radial direction. Each of the elastic arm parts 30b is configured to be vertically flexible about a point of support, i.e., a base end part thereof. In the state in which current application to the electromagnetic coil 36 is OFF, the movable clutch plate 26 is upwardly biased such that an engagement raised part 3a formed in the frame 3 is fitted into a corresponding one of the engagement recessed parts 26b formed at the upper surface of the movable clutch plate 26. Thus, the movable clutch plate 26 is fixed so as not to rotate relative to the frame 3, and therefore the first pinion gear 23 connected to the movable clutch plate 26 is fixed so as not to rotate relative to the frame 3. The plurality of engagement raised parts 3a are formed at a lower surface of a front side part of the frame 3, and are formed at positions corresponding to the engagement recessed parts 26b formed at the upper surface of the movable clutch plate 26. The engagement raised parts 3a are not necessarily formed in the frame 3. For example, the engagement raised parts 3a may be formed in the fixed roof 1 or a frame member of the vehicle.

A C-washer 32 is fitted into an upper end part of the small-diameter shaft part 22b of the first output shaft 22, thereby preventing detachment of the first pinion gear 23 toward the above. A ring washer 33 and a wave washer 34 are interposed between the C-washer 32 and the first pinion gear 23.

The operation of the first gear mechanism 20 of the drive unit 10 configured as described above will be described in detail with reference to FIGS. 5(a) and 5(b).

First, in the state in which current application to the electromagnetic coil 36 by the ECU is OFF, the engagement raised parts 3a of the frame 3 are, as described above, fitted into the engagement recessed parts 26b formed at the upper surface of the movable clutch plate 26, and the movable clutch plate 26 and the fixed clutch plate 25 are not engaged with each other (see FIG. 5(a)). Thus, in such a state, rotative power of the first output shaft 22 is not transmitted to the first pinion gear 23 by way of the fixed clutch plate 25 and the movable clutch plate 26. Thus, in the foregoing state, the first electromagnetic clutch 24 is in the disconnection state in which the first pinion gear 23 and the first output shaft 22 are disconnected from each other.

When current application to the electromagnetic coil 36 by the ECU is ON, the movable clutch plate 26 receives magnetic attractive force from the electromagnetic coil 36, and downwardly moves against biasing force of the plate spring 30 (see FIG. 5(b)). As a result, the engagement raised parts 3a of the frame 3 are disengaged from the engagement recessed parts 26b formed at the upper surface of the movable clutch plate 26, and the clutch tooth parts 26a formed at the lower surface of the movable clutch plate 26 are fitted into the engagement recessed parts 25a of the fixed clutch plate 25. Consequently, rotative power of the first output shaft 22 is transmitted to the first pinion gear 23 through the fixed clutch plate 25 and the movable clutch plate 26, thereby rotating the first pinion gear 23. In the foregoing manner, the first electromagnetic clutch 24 switches to the connection state in which the first pinion gear 23 is connected to the first output shaft 22.

When the first electromagnetic clutch 24 switches from the disconnection state to the connection state, rotation of the first output shaft 22 is transmitted to the first pinion gear 23. As a result, the sliders are driven in the front-back direction by the first geared cable 8 engaged with the first pinion gear 23, and therefore the movable panel 5 is opened/closed by the panel support plate connected to the sliders by the cams.

Next, the second gear mechanism 40 will be described. The second gear mechanism includes a second power transmission gear 41 engaged with the drive gear 19, a second output shaft 42 connected to the second power transmission gear 41 so as to rotate together with the second power transmission gear 41, a second pinion gear 43 rotatably connected to the second output shaft 42, and a second electromagnetic clutch 44.

The second geared cable 9 connected to the runner parts of the roller shade 6 are engaged with the second pinion gear 43. When the second pinion gear 43 rotates, the runner parts (not shown in the figure) of the roller shade 6 are driven in the front-back direction by the second geared cable 9, and therefore the shade 16 moves in an opening/closing direction (i.e., the front-back direction) together with the runner parts.

The detailed configuration of the second gear mechanism 40 is the same as that of the first gear mechanism 20. Thus, the detailed description will not be repeated, supposing that the "first output shaft 22" corresponds to the "second output shaft 42," the "first pinion gear 23" corresponds to the "second pinion gear 43," the "first electromagnetic clutch 24" corresponds to the "second electromagnetic clutch 44," and the "fixed clutch plate 25," the "engagement recessed parts 25a," the "movable clutch plate 26," the "clutch tooth parts 26a," and the "engagement recessed parts 26b" together forming the first electromagnetic clutch 24 corresponds a "fixed clutch plate 45," "engagement recessed parts 45a," a "movable clutch plate 46," "clutch tooth parts 46a," and "engagement recessed parts 46b" (see FIGS. 5(a) and 5(b)), respectively. FIGS. 5(a) and 5(b) illustrate the case where the first electromagnetic clutch 24 is in the connection state and the second electromagnetic clutch 44 is in the disconnection state.

In the drive unit 10 configured as described above, when both of the first and second electromagnetic clutches 24, 44 are in the connection state, rotative power of the motor 18 is transmitted to the first and second pinion gears 23, 43 through the first and second output shafts 22, 42. As a result, both of the movable panel 5 and the shade 16 are simultaneously driven by the first and second geared cables 8, 9 engaged respectively with the first and second pinion gears 23, 43.

On the other hand, when only the first electromagnetic clutch 24 is in the connection state and the second electromagnetic clutch 44 is in the disconnection state, rotative power of the motor 18 is transmitted only to the first pinion gear 23 through the first output shaft 22, and is not transmitted to the second pinion gear 43. As a result, while the shade 16 is stopped, only the movable panel 5 is driven by the first geared cable 8 engaged with the first pinion gear 23.

Moreover, when only the second electromagnetic clutch 44 is in the connection state and the first electromagnetic clutch 24 is in the disconnection state, rotative power of the motor 18 is transmitted only to the second pinion gear 43 through the second output shaft 42, and is not transmitted to the first pinion gear 23. As a result, while the movable panel 5 is stopped, only the shade 16 is driven by the second geared cable 9 engaged with the second pinion gear 43.

In the present embodiment, in such a manner that connection/disconnection in each of the first and second electromagnetic clutches 24, 44 is switched depending on user needs, the drive device can switch between an unselective transmission state in which rotative power of the motor 18 is transmitted to both of the movable panel 5 and the shade 16 and a selective transmission state in which rotative power of the motor 18 is selectively transmitted to one of the movable panel 5 or the shade 16.

Since each of the first and second pinion gears 23, 43 is connected to the output shaft 52 of the motor 18 through a corresponding one of the first and second output shafts 22, 42 in the unselective transmission state, braking force of the motor 18 constantly acts on each of the pinion gears 23, 43. Such braking force is substantially-great rotational resistance force generated by the motor 18 functioning as a type of a generator when the motor 18 is forcibly rotated. Thus, when vehicle collision occurs in the unselective transmission state, even if a rotational load acts on each of the pinion gears 23, 43 due to impact upon the collision, each of the pinion gears 23, 43 is not easily moved (rotated).

On the other hand, since one of the electromagnetic clutches 24, 44 is in the disconnection state in the selective transmission state, braking force of the motor 18 does not act on the pinion gear 23 (or 43) disconnected from the output shaft 22 (or 42). Thus, when vehicle collision occurs in the selective transmission state, there is a possibility that the pinion gear 23 (or 43) unexpectedly rotates due to impact upon the collision. However, in the present embodiment, the pinion gear 23 (or 43) is fixed to the frame 3 which is a fixed member of the vehicle through the movable clutch plate 26 (or 46). Thus, it can be ensured that unexpected rotation of the pinion gear 23 (or 43) is prevented.

That is, when only the first electromagnetic clutch 24 is in the connection state and the second electromagnetic clutch 44 is in the disconnection state, the second pinion gear 43 and the second output shaft 42 are disconnected from each other. However, the engagement raised parts 3a of the frame 3 are fitted into the engagement recessed parts 46b (see FIG. 3) formed at the upper surface of the movable clutch plate 46 connected to the second pinion gear 43. Thus, the second pinion gear 43 and the movable clutch plate 46 are fixed to the frame 3 so as to rotate together with the frame 3. As a result, when vehicle collision occurs, the second pinion gear 43 does not rotate due to impact upon the collision. Consequently, inaccurate determination of the position of the opened/closed shade 16 (i.e., the rotation angle of the second pinion gear 43) by the ECU can be prevented.

Moreover, when only the second electromagnetic clutch 44 is in the connection state and the first electromagnetic clutch 24 is in the disconnection state, the first pinion gear 23 and the first output shaft 22 are disconnected from each other. However, the engagement raised parts 3*a* of the frame 3 are fitted into the engagement recessed parts 26*b* (see FIGS. 3, 5(*a*), and 5(*b*)) formed at the upper surface of the first pinion gear 23. Thus, the first pinion gear 23 and the movable clutch plate 26 are configured to rotate together with the frame 3. As a result, when vehicle collision occurs, the first pinion gear 23 does not move together with the movable panel 5 due to impact upon the collision. Consequently, the following can be prevented: the movable panel 5 which is a heavy object is slammed shut by rotation of the first pinion gear 23 and therefore is damaged; and the position of the opened/closed movable panel 5 (i.e., the rotation angle of the first pinion gear 23) cannot be accurately determined by the ECU.

(Other Embodiment)

The present disclosure is not limited to the foregoing embodiment, and may have various configurations other than the foregoing. That is, in the foregoing embodiment, the example where the first driven member is the movable panel 5 and the second driven member is the shade 16 has been described. However, the present disclosure is not limited to such an example. For example, both of the first and second driven members may be movable panels 5 or shades 16. Moreover, the first and second driven members are not limited to the movable panel 5 and the shade 16. For example, the first and second driven members may be any members provided at the opening 2 of the vehicle, such as a deflector.

In the foregoing embodiment, the output shaft 52 of the motor 18 is connected to the drive gear 19 through the worm gear and the input gear 53 (i.e., a reduction gear), but the present disclosure is not limited to such a configuration. For example, the output shaft 52 of the motor 18 may be directly connected to the drive gear 19.

In the foregoing embodiment, the engagement recessed parts 26*b* are formed at the upper surface of the movable clutch plate 26, but engagement raised parts for fixing may be formed instead of the engagement recessed parts 26*b*. In such a case, engagement recessed parts into which the engagement raised parts are fitted may be formed in the frame 3.

In the foregoing embodiment, the clutch tooth parts 26*a* are formed at the lower surface of the movable clutch plate 26, but the present disclosure is not limited to such a configuration. Engagement recessed parts may be formed at the lower surface of the movable clutch plate 26, and clutch tooth parts to be fitted into the engagement recessed parts may be formed at the upper surface of the fixed clutch plate 25.

In the foregoing embodiment, the first and second electromagnetic clutches 24, 44 are the engagement clutches, but the present disclosure is not limited to such a configuration. For example, the first and second electromagnetic clutches 24, 44 may be dry clutches each configured to transmit power by friction force between the fixed clutch plate 25, 45 and the movable clutch plate 26, 46. That is, the first and second electromagnetic clutches 24, 44 may have any configurations as long as such clutches use magnetic force generated by the electromagnetic coil.

INDUSTRIAL APPLICABILITY

The present disclosure is useful for the drive device configured to drive the first and second driven members provided at the opening formed in the fixed roof of the vehicle. In particular, the present disclosure is useful in the case where at least one of the driven members is, e.g., the movable panel which is the heavy object.

DESCRIPTION OF REFERENCE CHARACTERS

1 Fixed Roof
2 Opening
3 Frame (Fixed Member)
3*a* Engagement Raised Part (Engagement Part)
5 Movable Panel (First Driven Member)
8 First Geared Cable (First Drive Cable)
9 Second Geared Cable (Second Drive Cable)
10 Drive Unit (Drive Device)
16 Shade (Second Driven Member)
18 Motor
19 Drive Gear
21 First Power Transmission Gear
22 First Output Shaft
23 First Pinion Gear
24 First Electromagnetic Clutch
25 Fixed Clutch Plate
25*a* Engagement Recessed Part (Engagement Part)
26 Movable Clutch Plate
26*a* Clutch Tooth Part (Clutch Engagement Part)
26*b* Engagement Recessed Part for Fixing (Fixing Engagement Part or First Fixing Means)
40 Second Gear Mechanism
41 Second Power Transmission Gear
42 Second Output Shaft
43 Second Pinion Gear
44 Second Electromagnetic Clutch
45 Fixed Clutch Plate
45*a* Engagement Recessed Part (Engagement Part)
46 Movable Clutch Plate
46*a* Clutch Tooth Part (Clutch Engagement Part)
46*b* Engagement Recessed Part for Fixing (Fixing Engagement Part or Second Fixing Means)
51 Worm Gear (Reduction Gear)
52 Output Shaft of Motor
53 Input Gear (Reduction Gear)

The invention claimed is:

1. A drive device for driving first and second driven members provided at an opening formed in a fixed roof of a vehicle, comprising:
   a single motor;
   a single drive gear directly connected to an output shaft of the motor or connected to the output shaft of the motor through a reduction gear;
   first and second power transmission gears engaged with the drive gear;
   a first output shaft connected to the first power transmission gear so as to rotate together with the first power transmission gear;
   a second output shaft connected to the second power transmission gear so as to rotate together with the second power transmission gear;
   a first pinion gear engaged with a first drive cable for driving the first driven member and supported so as to be fitted onto the first output shaft;
   a second pinion gear engaged with a second drive cable for driving the second driven member and supported so as to be fitted onto the second output shaft;
   a first electromagnetic clutch configured to switch between a connection state in which the first pinion gear is connected to the first output shaft so as to rotate together with the first output shaft and a disconnection state in which the first pinion gear and the first output shaft are disconnected from each other; and a second electromagnetic clutch configured to switch between a connection state in which the second pinion gear is connected to the second output shaft so as to rotate together with the second output shaft and a disconnection state in which the second pinion gear and the second output shaft are disconnected from each other, wherein the first electromagnetic clutch includes first fixing means configured to unrotatably fix the first pinion gear to a fixed member of the vehicle in the disconnection state of the first electromagnetic clutch, and the second electromagnetic clutch includes second fixing means configured to unrotatably fix the second pinion gear to the fixed member of the vehicle in the disconnection state of the second electromagnetic clutch.

2. The drive device of claim 1, wherein the first electromagnetic clutch further includes a fixed clutch plate coaxially fixed to the first output shaft so as to rotate together with the first output shaft, and a movable clutch plate supported so as to slide in an axial direction on the first pinion gear and to rotate together with the first pinion gear and arranged so as to face the fixed clutch plate in the axial direction, and a clutch engagement part to be engaged with an engagement part of the fixed clutch plate when the first electromagnetic clutch is in the connection state is formed at one of side surfaces of the movable clutch plate, a fixing engagement part to be engaged with an engagement part of the fixed member of the vehicle when the first electromagnetic clutch is in the disconnection state is formed at the other side surface of the movable clutch plate, and the fixing engagement part serves as the first fixing means.

3. The drive device of claim 2, wherein the second electromagnetic clutch further includes a fixed clutch plate coaxially fixed to the second output shaft so as to rotate together with the second output shaft, and a movable clutch plate supported so as to slide in the axial direction on the second pinion gear and to rotate together with the second pinion gear and arranged so as to face the fixed clutch plate in the axial direction, and a clutch engagement part to be engaged with an engagement part of the fixed clutch plate when the second electromagnetic clutch is in the connection state is formed at one of side surfaces of the movable clutch plate, a fixing engagement part to be engaged with an engagement part of the fixed member of the vehicle when the second electromagnetic clutch is in the disconnection state is formed in the other side surface of the movable clutch plate, and the fixing engagement part serves as the second fixing means.

\* \* \* \* \*